US011713861B2

United States Patent
Huester et al.

(10) Patent No.: US 11,713,861 B2
(45) Date of Patent: Aug. 1, 2023

(54) ILLUMINATING DEVICE AND HOMOGENISATION METHOD FOR VEHICLES HAVING TWO PIXELATED LIGHT SOURCES WITH TWO PARTIAL LIGHT DISTRIBUTION PATTERNS

(71) Applicant: HELLA GMBH & CO. KGAA, Lippstadt (DE)

(72) Inventors: Christian Huester, Salzkotten (DE); Boris Kubitza, Moehnesee-Koerbecke (DE); Martin Pluempe, Bad Wuennenberg (DE); Udo Venker, Guetersloh (DE); Carsten Wilks, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/571,037

(22) Filed: Jan. 7, 2022

(65) Prior Publication Data

US 2022/0128210 A1     Apr. 28, 2022

Related U.S. Application Data

(63) Continuation of application No. PCT/EP2020/067869, filed on Jun. 25, 2020.

(30) Foreign Application Priority Data

Jul. 8, 2019   (DE) .................. 10 2019 118 381.2

(51) Int. Cl.
*F21S 41/663* (2018.01)
*F21S 41/675* (2018.01)
(Continued)

(52) U.S. Cl.
CPC .......... *F21S 41/663* (2018.01); *B60Q 1/1415* (2013.01); *F21S 41/153* (2018.01);
(Continued)

(58) Field of Classification Search
CPC ............... F21S 41/153; B60Q 2400/20; B60Q 2300/054
See application file for complete search history.

(56) References Cited

U.S. PATENT DOCUMENTS 10,400,974 B2   9/2019   Kanayama et al.
10,584,842 B2   3/2020   Park
(Continued)

FOREIGN PATENT DOCUMENTS

DE   102009020910 A1   11/2010
DE   102016122499 A1   5/2018
(Continued)

OTHER PUBLICATIONS

International Search Report dated Sep. 30, 2020 in corresponding application PCT/EP2020/067869.

*Primary Examiner* — Robert J May
(74) *Attorney, Agent, or Firm* — Muncy, Geissler, Olds & Lowe, P.C.

(57) ABSTRACT

An illuminating device for vehicles, including a first light unit, which contains a first light source having a number of first light pixels for generating a first partial light distribution including a second light unit, which contains a second light source having a number of second light pixels for generating a second partial light distribution. The second light pixels are arranged in a boundary region of the second light source and are controllable as a group in such a way that a number of the second light pixels controlled as a group in the boundary region of the second light source per unit of
(Continued)

surface area increases from a first end of the boundary region in the direction of a second end of the boundary region.

13 Claims, 3 Drawing Sheets

(51) Int. Cl.
  *F21S 41/153*  (2018.01)
  *F21S 41/64*  (2018.01)
  *B60Q 1/14*  (2006.01)
(52) U.S. Cl.
  CPC ........... *F21S 41/645* (2018.01); *F21S 41/675* (2018.01); *B60Q 2300/054* (2013.01)

(56) References Cited

U.S. PATENT DOCUMENTS

| | | | |
|---|---|---|---|
| 11,187,392 | B2 | 11/2021 | Grötsch et al. |
| 11,435,052 | B2 * | 9/2022 | Mimoun ............... F21S 41/675 |
| 2018/0056850 | A1 | 3/2018 | Schwaiger |
| 2019/0202343 | A1 | 7/2019 | Funk et al. |

FOREIGN PATENT DOCUMENTS

| | | |
|---|---|---|
| DE | 102017129254 A1 | 7/2018 |
| DE | 102018104259 A1 | 8/2018 |
| DE | 102017128125 A1 | 5/2019 |
| EP | 3088249 A1 | 11/2016 |
| EP | 3401838 A1 | 11/2018 |
| FR | 3068436 A1 | 1/2019 |
| WO | WO2017158044 A1 | 9/2017 |

* cited by examiner

ILLUMINATING DEVICE AND HOMOGENISATION METHOD FOR VEHICLES HAVING TWO PIXELATED LIGHT SOURCES WITH TWO PARTIAL LIGHT DISTRIBUTION PATTERNS

This nonprovisional application is a continuation of International Application No. PCT/EP2020/067869, which was filed on Jun. 25, 2020, and which claims priority to German Patent Application No. 10 2019 118 381.2, which was filed in Germany on Jul. 8, 2019, and which are both herein incorporated by reference.

BACKGROUND OF THE INVENTION

Field of the Invention

The present invention relates to an illuminating device for vehicles, including a first light unit, which contains a first light source having a number of first light pixels for generating a first partial light distribution, including a second light unit, which contains a second light source having a number of second light pixels for generating a second partial light distribution, the second partial light distribution having a higher resolution than the first partial light distribution, including a control unit for controlling the first light source and the second light source, so that an illumination intensity gradient and/or a resolution difference gradient may be reduced in a transition region between the first partial light distribution and the second partial light distribution.

The invention further relates to a method for homogenizing a light distribution for vehicles, such that a first light source is controlled for generating a first partial light distribution of the light distribution having a plurality of first light points, a second light source is controlled for generating a second partial light distribution of the light distribution having a plurality of second light points, the second light points having a smaller dimension that the first light points, second light pixels of the second light unit being controlled in such a way that an illumination intensity gradient and/or a resolution difference gradient between the first partial light distribution and the second partial light distribution is reduced in a transition region between the first partial light distribution and the second partial light distribution.

Description of the Background Art

An illuminating device for vehicles is known from DE10 2016 122 499 A1, which is incorporated herein by reference, and which includes a first light unit and a second light unit, each containing first light sources and second light sources. The two light units each generate a partial light distribution, which form a predefined light distribution by means of overlapping. The light distribution has a transition region between the first partial light distribution and the second partial light distribution, light points of the transition region being formed by projected light pixels of the first light unit and the second light unit. The first light unit and the second light unit each have the same resolution, so that the light points of the first partial light distribution and the second partial light distribution are of the same size. If setpoint values for the individual light points of the light distribution are unable to be reached, due to an incorrect position or failure of individual light pixels of the first light unit and/or the second light unit, this may be compensated for by corresponding control of the corresponding light pixels of the other light unit.

A lighting device for vehicles is known from DE 10 2017 128 125 A1, which corresponds to U.S. Pat. No. 11,187,392, which includes a first light unit containing a number of first light sources arranged in a matrix-like manner and a second light unit having a number of second light sources arranged in a matrix-like manner. Different optical units are assigned to the first light unit and the second light unit, so that the first light unit may be used to generate a first partial light distribution and the second light unit to generate a second partial light distribution, the second partial light distribution having light points of a higher resolution than the first partial light distribution. In this way, a preferably brighter illumination region contained within the first partial light distribution may be generated by the second partial light distribution.

An illuminating device for vehicles is known from DE 10 2017 129 254 A1, which includes a first light unit containing a number of first light sources and an optical unit for generating a first partial light distribution and a second light unit containing a number of second light sources and an optical unit for generating a second partial light distribution. Due to the different optical elements, the second partial light distribution has a higher resolution than the first partial light distribution. This means that the light points of the second partial light distribution each have a smaller dimension that the light points of the first partial light distribution. The second partial light distribution has a smaller width and a smaller height than the first partial light distribution. A transition region between the first partial light distribution and the second partial light distribution always results, depending on the predefined light distribution. To reduce illumination intensity gradients in this transition region, i.e., to reduce local brightness differences in the transition region, certain light sources of the second light unit are controlled with a reduced light intensity. The homogeneity of the light distribution improved hereby may be achieved only if the location of the inhomogeneity is detected. For this purpose, a measuring apparatus is provided, which evaluates the sensor data of an optical sensor and transmits control signals to the light sources of the second light unit, so that corresponding light points in the transition region have a comparatively lower illumination intensity. The disadvantage of the known illuminating device is that the reduction of the illumination intensity gradient in the transition region is relatively complex.

SUMMARY OF THE INVENTION

It is therefore an object of the present invention to provide an illuminating device for vehicles as well as a method for homogenizing a light distribution, such that inhomogeneities in a transition region between a first partial light distribution and a second partial light distribution are reduced, so that an optimal, in particular continuous, resolution is given for a predefined light distribution.

To achieve this object, the invention, in an exemplary embodiment, provides that the second light source can have a higher resolution than the first light source, the second light source having a multiple of second light pixels compared to the first light source, based on an equal surface area, the second light pixels arranged in a boundary region of the second light source are controllable as a group in such a way that a number of the second light pixels controlled as a group in the boundary region of the second light source per unit of surface area increases from a first end of the boundary region in the direction of a second end of the boundary region.

The light sources of the different light units can have a different resolution. A second light source of a second light unit can have a higher resolution than a first light source of a first light unit. For example, the first light source and the second light source may be arranged directly next to each other, which reduces the installation space requirements. While the first light source covers a first surface area section, the second light source cover a second surface area section. With respect to an equal surface area of the first surface area section and/or the second surface area section, a multiple of light pixels are arranged in the second surface area section compared to the first surface area section. To reduce the inhomogeneity induced in the total light distribution, due to the different resolutions of the first and second light sources, in the transition region between a first partial light distribution effectuated by the first light unit and a second partial light distribution effectuated by the second light unit, the invention provides to always control the light pixels as a group in a boundary region of the second surface area section or the second light source, so that the number of the light pixels of the second light source controlled as a group increases per unit of surface area from a first end of the boundary region, which preferably faces the first surface area section, in the direction of a second end of the boundary region, which preferably faces away from the first surface area section. This causes the resolution of the light sources to increase gradually from the first light source in the direction of the second light source and not abruptly at a boundary line. Instead, a boundary region is defined, which has a predefined width. The inherently high-resolution light pixels in the boundary area are sacrificed in favor of light pixels which have a lower resolution, so that hard edges or distorted representations in the entire light distribution are avoidable. Depending on the width of the boundary region, a stepped or approximately continuous adaptation between the low-resolution first light source and the high-resolution light pixels of the second light source may be induced. This compensation of inhomogeneities in the light distribution is achieved by reducing the surface area of the high-resolution second light source.

The number of light pixels of the second light source controllable as a group in the boundary region can increase according to a predefined transition function. The transition function is stored in a control unit or in a light distribution setpoint data memory of the control unit, so that the transition between the low-resolution first light source and the high-resolution second light source may take place more or less harmoniously, depending on a predefined light distribution, for example glare-free high beam, low beam, cornering light.

The number of light pixels exclusively controllable as a group per unit of surface area can occur in the boundary area in such a way that the number of light pixels arranged as a group per unit of surface area in the region of a first end of the boundary region is greater than the number of light pixels arranged as a group per unit of surface area in a region of the second end of the boundary region. In this way, a more or less smooth transition is established between the light pixels of the first and second light sources having different resolutions in the region of ends of the boundary region.

The transition functions run in a linearly stepped manner or in a square-stepped manner. The smaller the steps, the more continuously may the transition take place between the light pixels of the first light source and the second light source having different resolutions.

A width of the boundary region, which extends from the first end to the second end of the boundary region, can correspond to a width in a range between one and five times the width of the light pixels of the first light source. The size of the width of the boundary region is selected in such a way that a harmonious transition between different partial light distributions is ensured for the human eye.

The light pixels of the first and second light sources can be arranged on a shared carrier. A shared optical element is assigned to the light pixels of the first and second light sources, so that an installation space-saving illuminating device may be provided. The optical element preferably has an equal imaging characteristic for both light sources.

The first light source and the second light source can each include LED light sources as light pixels. The first light source and/or the second light source is/are preferably designed as SSL light source(s). A single light source is, in effect, advantageously created, which has surface areas of different resolutions.

The second light source may also include LCD luminous elements or DMD luminous elements. A certain second partial light distribution may be advantageously generated hereby, depending on the predefined light distribution.

The light pixels of the second light source may be exclusively controlled as a group in a boundary region of the same.

A second light source can be made up of a plurality of light pixels, which has a greater number of light pixels than a first light source, based on an equal surface area, is controlled in such a way that light pixels are controlled exclusively as a group in a boundary region of the second light source. In this way, a homogenization with respect to the resolution of the two light sources in relation to each other may take place in a transition region between the first and second light sources. A sharp decrease in the resolution in a transition region between the first partial light distribution and the second partial light distribution may thus be avoided.

Light pixels of the first light source and the second light source can be controlled individually in the region outside the boundary region, while the light pixels in the boundary region are controlled essentially as a group. Since the boundary region is situated in the surface area section of the second light source, a reduction in the resolution in favor of a homogeneous transition between the first and second partial light distributions may be taken into account.

The light pixels of the second light source can be controlled in the boundary region according to a transition function, which is dependent on the predefined light distribution. Gradients between the first partial light distribution and the second partial light distribution, due to resolution differences, may thus be reduced.

The light pixels of the second light source can be controlled in such a way that the boundary region, in which the light pixels are controlled exclusively as a group, is adjusted to a light center-of-gravity shift of the light distribution. In this way, a homogeneous transition between the first and the second partial light distributions may always be established, regardless of the location of the light center of gravity of the light distribution.

The setpoint data for controlling the first and second light sources can be generated, depending on sensor data detecting the vehicle surroundings, so that a glare-free generation of the light distribution is always ensured.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
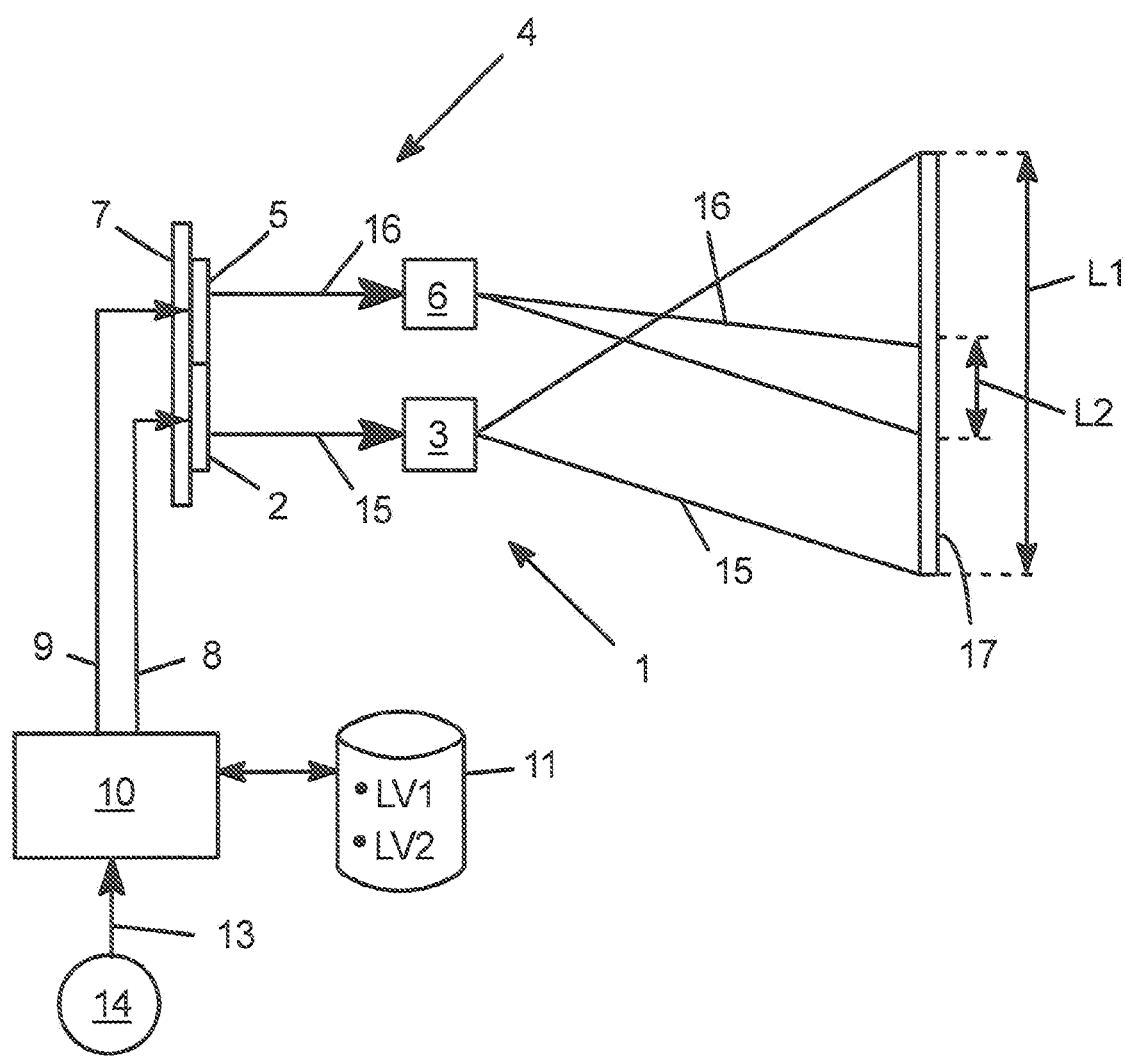
FIG. 1 shows a schematic representation of an illuminating device, including a first light unit and including a second light unit.

An illuminating device according to the invention is used to generate multiple different light distributions, for example low beam, high beam, city or highway light, it being possible to additionally generate signaling functions, for example, marking light or logo projection light.

The illuminating device is installed in a housing of a headlamp, which is arranged in a front region of the vehicle. The illuminating device includes a first light unit 1 having a first light source 2 and a first optical element 3, with the aid of which a first partial light distribution L1 is generated on a measuring screen or in an area in front of the vehicle. The illuminating device further comprises a second light unit 4 having a second light source 5 and a second optical element 6, with the aid of which a second partial light distribution L2 is generated on the measuring screen or in an area in front of the vehicle.

First light source 2 and second light source 5 are arranged on a shared carrier 7 and, in the present exemplary embodiment, directly next to each other. As is apparent from FIG. 2, second light source 5 has a higher resolution than first light source 2. After all, second light source 5 has a multiple of light pixels 5' per unit of surface area, compared to light pixels 2' of first light source 2. In a surface area, which corresponds to one single light pixel 2', 8×8, i.e. 64, light pixels 5' are distributed in a matrix-like manner.

The surface area of first light source 2 and second light source 5, or a first surface area section of first light source 2 and a second surface area section of second light source 5, are designed to be of equal size in the present exemplary embodiment. First light source 2 comprises three light pixels 2'. Second light source 5 comprises 3×64 light pixels 5', i.e., a total of 192 light pixels 5'.

First light source 2 may have the same number of light pixels 2' as second light source 5, a low-resolution first light source 2 having only three light pixels 2' being created by a grouped control of individual light pixels 5' situated next to each other.

Light pixels 2' of first light source 2 and light pixels 5' of second light source 5 are individually controllable via particular control signals 8, 9. Light pixels 2', 5', which are preferably made up of LED diodes, are controlled by a control unit 10, which generates corresponding control signals 8, 9, depending on light distributions LV1, LV2 stored in a setpoint data memory 11. If the light distribution is a dynamic one, for example glare-free high beam, corresponding setpoint data 12, which are called up from setpoint data memory 11 in control unit 10, are corrected or adapted by up-to-date surroundings data 13 of a surroundings sensor 14.

To generate a light distribution LV1, which represents a low-beam light distribution, first light source 2 and second light source 5 are controlled with the aid of control signals 8 and 9, in such a way that light 15 emitted by first light source 2 for a first partial light distribution L1 is projected onto a measuring screen 17 situated 25 m away with the aid of first optical element 3, first partial light distribution L1 representing a relatively large base surface area of light distribution LV1. Second light source 5 is controlled with the aid of control signal 9 in such a way that light 16 emitted by light source 5 is projected by optical element 6 onto measuring screen 17 for a second partial light distribution L2, which is arranged within first partial light distribution L1 and effectively represents a light center of gravity of light distribution LV1. Light points 18 of first partial light distribution L1 are designed to be larger in comparison to light points 19 of second partial light distribution L2. Second light unit 4 thus generates a higher-resolution second partial light distribution L2 than first light unit 1, which generates first partial light distribution L1. Light points 19 of second partial light distribution L2 have a higher illumination intensity than light points 18 of first partial light distribution L1. Second partial light distribution L2 may have, for example, a horizontal width of +/−14° and a vertical height of −7° to +2°. First partial light distribution L1 may have a horizontal width in the range of −22° to +22° and a vertical height of −5° to +5°. The maximum illumination intensity of second light unit 5 may be in the range of 160 lx to 170 lx, and the maximum illumination intensity of first light unit 2 may be in a range from 40 lx to 50 lx. The illumination intensity ratio between second partial light distribution L2 and first partial light distribution L1 is thus greater than 3.

Figure 5:
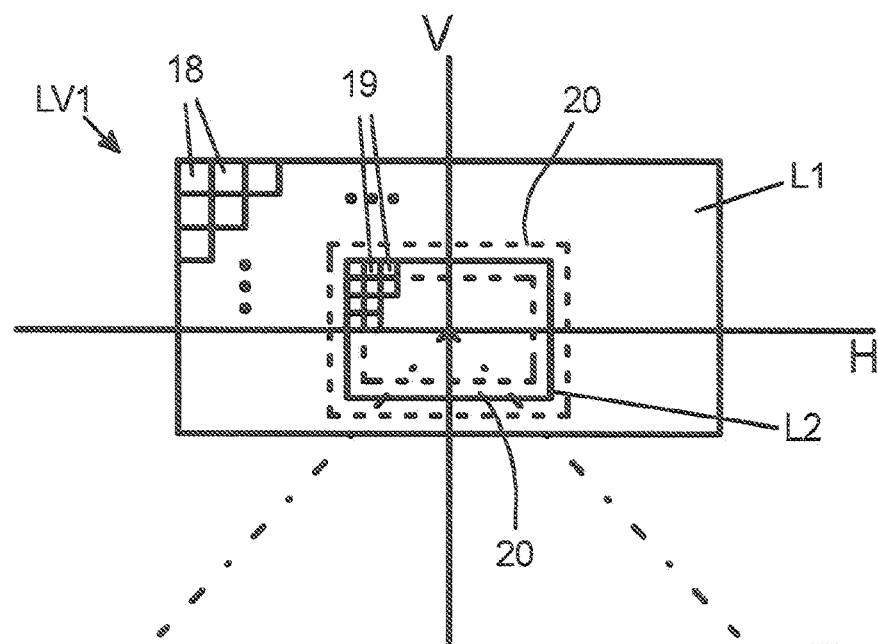
FIG. 5 shows a light distribution made up of a first partial light distribution generated with the aid of the first light source and a second partial light distribution generated with the aid of the second light source in the operating state of the light sources according to FIG. 3.

It is apparent from FIG. 5 that light points 18 and 19 overlap each other in a core region filled out by second partial light distribution L2. In a transition region 20 between first partial light distribution L1 and second partial light distribution L2, which is marked by the dashed line, an illumination intensity gradient is relatively high during the control of light sources 2, 5 according to FIG. 2, so that an inhomogeneous transition occurs between first partial light distribution L1 and second partial light distribution L2. To avoid a significant illumination intensity gradient of this type, or to avoid an inhomogeneity of this type, which may result in a distorted light image, is provided according to the invention that a part of second light source 5 is operated at a lower resolution than would be possible. In the present exemplary embodiment, light pixels 5' of second light source 5 arranged in a boundary region 21 of first light source 2 are controlled exclusively as a group, i.e. multiple light pixels 5' are switched on or off simultaneously or dimmed in the same manner, so that second light source 5 is operated at a lower resolution in boundary region 21 of the same than in a remaining region of second light source 5.

Figure 2:
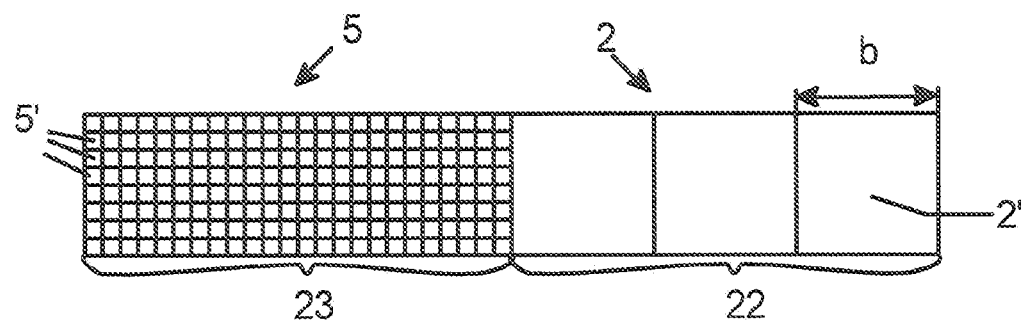
FIG. 2 shows a front view of a low-resolution first light source and a high-resolution second light source, which each include a plurality of light pixels.

First light source 2 passes over a first surface area section 22, and second light source 5 passes over a second surface area section 23, the two surface area sections 22, 23 having the same dimension, cf. FIG. 2. The illustration is an example. It is understood that the dimension or the number of light pixels 2', 5' may be significantly larger.

Figure 3:
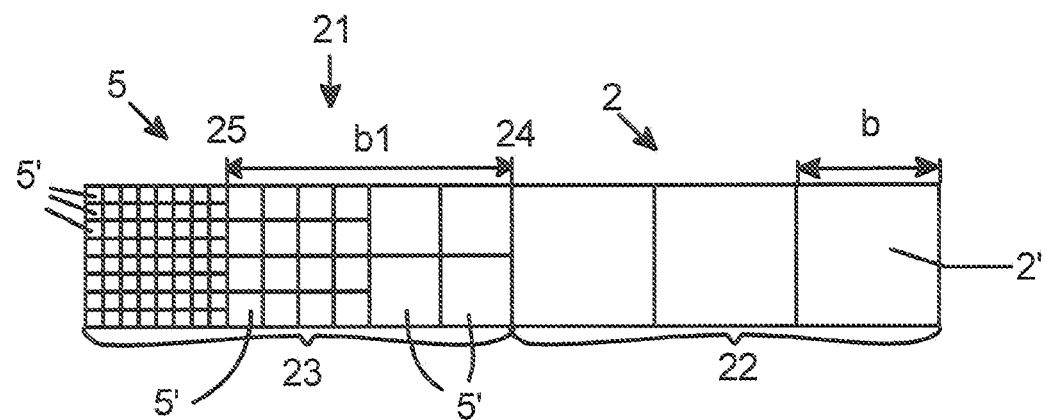
FIG. 3 shows a front view of the first light source and the second light source in a first operating state.
Figure 4:
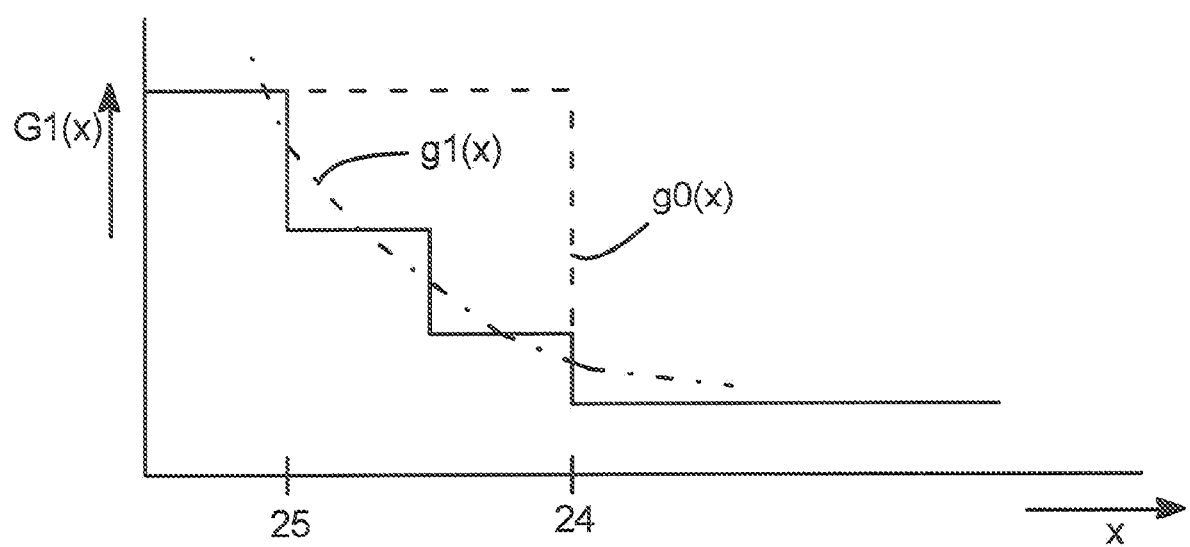
FIG. 4 shows a resolution distribution of the first and second light sources in the operating state according to FIG. 3.

In a first operating state of the illuminating device according to FIGS. 3 and 4, boundary region 21 of second light source 5 corresponds to ⅔ of second surface area section 23. It is apparent that the number of light pixels 5' controlled as a group increases from a first end 24 of boundary region 21 facing first light source 2 in the direction of a second end 25 of boundary region 21 facing away from first light source 2 or first surface area section 22. It is apparent from FIG. 4 that the resolution increases gradually and/or in a stepped manner from first end 24 to second end 25. A homogenization or a reduction in resolution difference gradient $g_{1(x)}$ thus takes place; while a resolution difference gradient $g_{0(x)}$ with the control according to FIG. 2 is approximately infinite, cf. dashed profile in FIG. 4, resolution difference gradient $g_{1(x)}$ in the first operating state of the illuminating device according to FIGS. 3 and 4 runs with a relatively flat incline.

The number of light pixels 5' of second light source 5 to be controlled as a group in boundary region 21 may occur according to a predefined transition function, which may be stored in setpoint data memory 11.

In the present exemplary embodiment according to FIGS. 3 and 4, only three resolution steps are illustrated as by way of example. It is understood that the number of steps may be arbitrarily increased, so that undesirable distortions or inhomogeneities in representing symbols or displaying leader lines in the light distribution may be further reduced. In the case of infinitesimally small steps, transition region 20 between first partial light distribution L1 and second partial light distribution L2 may be continuous. Transition function $G_{1(x)}$ illustrated in FIG. 4 may thus be provided with a linearly stepped or square-stepped or continuous design.

In the present exemplary embodiment, boundary region 21 has a width b1, which is in a range between a width b of first light pixels 2' and five times the width b of light pixels 2'.

Figure 6:
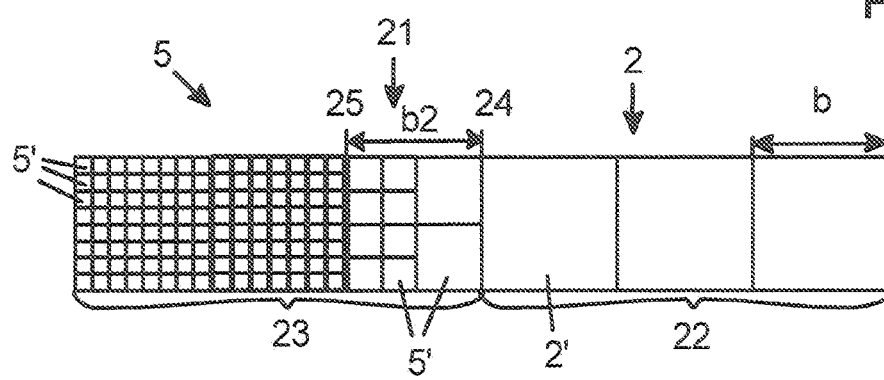
FIG. 6 shows a front view of the first light source and the second light source in a second operating state.
Figure 7:
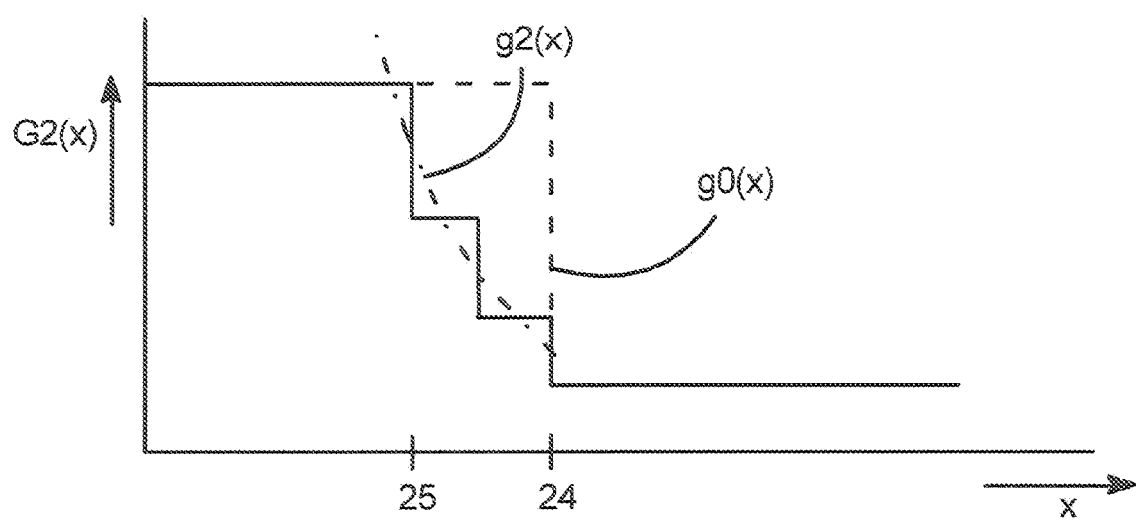
FIG. 7 shows a resolution distribution of the first and second light sources in a second operating state according to FIG. 6.

Width b1 of boundary region 21 is dependent on the light distribution to be generated and/or the light function and/or a symbol to be generated. For example, if an optimal edge is to be generated for a glare-free high-beam light distribution, a boundary region 21' according to a second operating state according to FIGS. 6 and 7 may have a width b2, which is half the size of width b1 of boundary region 21 according to FIGS. 3 and 4. Although a transition function $G_{2(x)}$ formed in this manner has the same quantity, resolution difference gradient $g_{2(x)}$ is steeper than resolution difference gradient $g_{1(x)}$ according to the first operating state.

It is understood that, with the setpoint input of setpoint data memory 11, according to which an adaptive headlight distribution LV2 is to be set, second partial light distribution L2 is shifted to the left or right along the horizontal, depending on the steering angle of the vehicle. Transition region 20 or boundary region 21, 21' shifts in the same way.

In the present exemplary embodiment, different optical elements 3, 6 are assigned to first light source 2 and second light source 5. In certain applications, the same optical elements may also be assigned to light sources 2, 5.

According to an example, first light source 2 and second light source 5 may also be arranged at a distance from each other. Boundary region 21, 21' of second light source 5 may alternatively also be arranged on a side of second light source 5 not facing first light source 2. By selecting second optical element 6, light 16 emitted from boundary region 21, 21' may be projected into the corresponding illumination region for generating second light distribution LV2.

According to an example, second light source 5 may also be designed as an LCD light source having a plurality of light pixels or as a DMD light source having a plurality of illuminated mirrors.

Light pixels 2' of first light source 2 can be of the same size. Light pixels 5' of second light source 5 are preferably of the same size. Light pixels 5' of second light source 5 are designed to be smaller than light pixels 2' of first light source 2. A higher angle resolution of light 16 is ensured with second light source 5, compared to the angle resolution of light 15 of first light source 2. For example, the angle resolution of second light source 5 may be 0.1°×0.1°. The angle resolution of first light source 2 may be 0.5°×0.5°.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An illuminating device for a vehicle, the illuminating device comprising:
    a first light unit, which contains a first light source having at least two first light pixels for generating a first partial light distribution;
    a second light unit, which contains a second light source having at least two second light pixels for generating a second partial light distribution, the second partial light distribution having a higher resolution than the first partial light distribution; and
    a control unit to control the first light source and the second light source so that an illumination intensity gradient and/or a resolution difference gradient are adapted to be reduced in a transition region between the first partial light distribution and the second partial light distribution;
    wherein the second light source has a higher resolution than the first light source, the second light source having a multiple of the second light pixels compared to the first light pixels of the first light source, based on an equal surface area;
    wherein the second light pixels arranged in a boundary region of the second light source are controllable as a group such that a number of the second light pixels controlled as a group in the boundary region of the second light source per unit of surface area increases from a first end of the boundary region in the direction of a second end of the boundary region, and
    wherein the number of the second light pixels controlled as a group in the boundary region of the second light source are controllable according to a transition function stored in a setpoint data memory.

2. The illuminating device according to claim 1, wherein the transition function runs in a stepped manner.

3. The illuminating device according to claim 1, wherein the first light source and the second light source are arranged on a shared carrier.

4. The illuminating device according to claim 1, wherein the first light source is designed as an LED light source or as a solid-state LED array light source.

5. The illuminating device according to claim 1, wherein the second light source is designed as an LED light source or as a solid-state LED array light source.

6. The illuminating device according to claim 1, wherein the second light source is designed as an LCD light source or as a DMD light source.

7. An illuminating device for a vehicle, the illuminating device comprising:
- a first light unit, which contains a first light source having at least two first light pixels for generating a first partial light distribution;
- a second light unit, which contains a second light source having at least two second light pixels for generating a second partial light distribution, the second partial light distribution having a higher resolution than the first partial light distribution; and
- a control unit to control the first light source and the second light source so that an illumination intensity gradient and/or a resolution difference gradient are adapted to be reduced in a transition region between the first partial light distribution and the second partial light distribution;
- wherein the second light source has a higher resolution than the first light source, the second light source having a multiple of the second light pixels compared to the first light pixels of the first light source, based on an equal surface area;
- wherein the second light pixels arranged in a boundary region of the second light source are controllable as a group such that a number of the second light pixels controlled as a group in the boundary region of the second light source per unit of surface area increases from a first end of the boundary region in the direction of a second end of the boundary region, and
- wherein the number of the light pixels controlled as a group of the second light pixels arranged in the boundary region of the second light source increases from the first end facing the first light source in the direction of the second end of the boundary region facing away from the first light source.

8. An illuminating device for a vehicle, the illuminating device comprising:
- a first light unit, which contains a first light source having at least two first light pixels for generating a first partial light distribution;
- a second light unit, which contains a second light source having at least two second light pixels for generating a second partial light distribution, the second partial light distribution having a higher resolution than the first partial light distribution; and
- a control unit to control the first light source and the second light source so that an illumination intensity gradient and/or a resolution difference gradient are adapted to be reduced in a transition region between the first partial light distribution and the second partial light distribution;
- wherein the second light source has a higher resolution than the first light source, the second light source having a multiple of the second light pixels compared to the first light pixels of the first light source, based on an equal surface area;
- wherein the second light pixels arranged in a boundary region of the second light source are controllable as a group such that a number of the second light pixels controlled as a group in the boundary region of the second light source per unit of surface area increases from a first end of the boundary region in the direction of a second end of the boundary region, and
- wherein a width between the first end and the second end of the boundary region is in a range between one and five times the width of the light pixels of the first light source.

9. The illuminating device according to claim 8, wherein the width of the boundary region is dependent on the light distribution to be generated and/on a symbol to be generated in the light distribution.

10. A method for homogenizing a light distribution for vehicles, the method comprising:
- controlling a first light source to generate a first partial light distribution of the light distribution having at least two first light pixels;
- controlling a second light source to generate a second partial light distribution of the light distribution having at least two second light pixels, the second light pixels having a smaller dimension than the first light pixels;
- controlling the second light pixels of the second light unit such that an illumination intensity gradient and/or a resolution difference gradient between the first partial light distribution and the second partial light distribution is reduced in a transition region between the first partial light distribution and the second partial light distribution; and
- controlling the second light pixels of the second light source exclusively as a group in a boundary region,
- wherein the second light pixels arranged in the boundary region of the second light source are controlled accordingly in a transition function so that the number of the second light pixels controlled as a group per unit of surface area increase in one direction.

11. The method according to claim 10, wherein the first light pixels of the first light source and the second light pixels of the second light source which are arranged outside the boundary region of the second light source are controlled individually.

12. The method according to claim 10, wherein the second partial light distribution and the transition region are adjusted in one direction according to a predefined dynamic light distribution.

13. A method for homogenizing a light distribution for vehicles, the method comprising:
- controlling a first light source to generate a first partial light distribution of the light distribution having at least two first light pixels;
- controlling a second light source to generate a second partial light distribution of the light distribution having at least two second light pixels, the second light points pixels having a smaller dimension than the first light pixels;
- controlling the second light pixels of the second light unit such that an illumination intensity gradient and/or a resolution difference gradient between the first partial light distribution and the second partial light distribution is reduced in a transition region between the first partial light distribution and the second partial light distribution; and
- controlling the second light pixels of the second light source exclusively as a group in a boundary region,
- wherein the first light pixels of the first light source and/or the second light pixels of the second light source are controlled according to setpoint data predefined with the aid of a setpoint data memory, the setpoint data being changed depending on surroundings data ascertained by a surroundings sensor, and the second light pixels arranged in the boundary region of the second light source are adjusted to the transition region of the locally changed second partial light distribution.

* * * * *